United States Patent
Huang et al.

(10) Patent No.: US 12,470,496 B2
(45) Date of Patent: Nov. 11, 2025

(54) DATA REORDERING METHOD AND APPARATUS THEREOF

(71) Applicant: MEDIATEK INC., Hsinchu (TW)

(72) Inventors: Chi-Han Huang, Hsinchu (TW);
Yen-Hsiung Tseng, Hsinchu (TW);
Cheng-Ying Wu, Hsinchu (TW);
Wei-Wen Lin, Hsinchu (TW)

(73) Assignee: MEDIATEK INC., Hsinchu (TW)

( * ) Notice: Subject to any disclaimer, the term of this patent is extended or adjusted under 35 U.S.C. 154(b) by 9 days.

(21) Appl. No.: 18/414,774

(22) Filed: Jan. 17, 2024

(65) Prior Publication Data

US 2024/0244007 A1    Jul. 18, 2024

Related U.S. Application Data

(60) Provisional application No. 63/480,315, filed on Jan. 18, 2023.

(51) Int. Cl.
*G06F 15/173* (2006.01)
*H04L 47/2408* (2022.01)
*H04L 47/34* (2022.01)

(52) U.S. Cl.
CPC .......... *H04L 47/34* (2013.01); *H04L 47/2408* (2013.01)

(58) Field of Classification Search
CPC ... H04L 47/34; H04L 47/2408; H04L 1/0061; H04L 49/9057; H04W 28/06
See application file for complete search history.

(56) References Cited

U.S. PATENT DOCUMENTS

| | | | | |
|---|---|---|---|---|
| 2019/0150214 A1* | 5/2019 | Zhou | ..................... | H04W 76/15 370/329 |
| 2023/0117751 A1* | 4/2023 | Kneckt | ................. | H04W 80/02 370/329 |
| 2024/0205913 A1* | 6/2024 | Esswie | .............. | H04W 72/1263 |

FOREIGN PATENT DOCUMENTS

WO   2020146401 A1   7/2020

OTHER PUBLICATIONS

Chinese language office action dated Oct. 4, 2024, issued in application No. TW 113102107.

* cited by examiner

*Primary Examiner* — John B Walsh
(74) *Attorney, Agent, or Firm* — McClure, Qualey & Rodack, LLP (57) ABSTRACT

A reordering method performed by a receiving apparatus is provided. The receiving apparatus may receive a first PPDU from a transmitting apparatus, wherein the first PPDU includes a plurality of MPDUs, and the MPDUs correspond to the same BA window. The receiving apparatus may determine a traffic that each of the MPDUs belongs to according to an MPDU identification, wherein traffics that the plurality of MPDUs belonging to include a first traffic and a second traffic which is different from the first traffic. The receiving apparatus may perform a reordering operation for the MPDUs belonging to the first traffic, and a reordering operation for the MPDUs belonging to the second traffic, respectively. The receiving apparatus may transmit a BA frame in response to the first PPDU to the transmitting apparatus, wherein the BA frame includes information for indicating whether the MPDUs in the first PPDU have been successfully received.

18 Claims, 8 Drawing Sheets

DATA REORDERING METHOD AND APPARATUS THEREOF

CROSS REFERENCE TO RELATED APPLICATIONS

This application claims the benefits of U.S. Provisional Application No. 63/480,315 filed on Jan. 18, 2023, the entirety of which is incorporated by reference herein.

BACKGROUND OF THE INVENTION

Field of the Invention

The invention generally relates to wireless communication technology, and more particularly, to a data reordering technology for physical layer (PHY) protocol data unit (PPDU) transmission.

Description of the Related Art

As demand for ubiquitous computing and networking has grown, various wireless technologies have been developed, including Wireless-Fidelity (Wi-Fi) which is a Wireless Local Area Network (WLAN) technology allowing mobile devices (such as a smartphone, a smart pad, a laptop computer, a portable multimedia player, an embedded apparatus, or the like) to obtain wireless services in a frequency band of 2.4 GHz, 5 GHz, 6 Gz or 60 GHz.

The Institute of Electrical and Electronics Engineers (IEEE) has developed and commercialized various technological standards since the initial WLAN technology supported using frequencies of 2.4 GHz. For example, IEEE 802.11ac supports Multi-User (MU) transmission using spatial degrees of freedom via a MU-Multiple Input-Multiple-Output (MU-MIMO) scheme in a downlink (DL) direction from an Access Point (AP) to Stations (STAs). To improve performance and meet users' demand for high-capacity and high-rate services, IEEE 802.11ax has been proposed, which uses both Orthogonal Frequency Division Multiple Access (OFDMA) and MU-MIMO in both DL and uplink (UL) directions. That is, in addition to supporting frequency and spatial multiplexing from an AP to multiple STAs, transmissions from multiple STAs to the AP are also supported in IEEE 802.11ax.

A physical layer (PHY) protocol data unit (PPDU) comprises a plurality of medium access control (MAC) PDUs (MPDUs) associated with multiple traffics. In the conventional technology for multi-layer physical layer (PHY) protocol data unit (PPDU) transmission, multiple traffics may be in the same block acknowledgement (BA) agreement. That is, different traffic in a multi-layer PPDU may correspond to the same BA window. However, when one of the traffics has no frame check sequence (FCS) error, but there are some corrupted MPDUs in the other traffic, MPDUs of the traffic without the FCS error still needs to be buffered in the Wi-Fi medium access control (MAC) layer. Therefore, the latency for the traffic without the FCS error will be increased.

Different traffics can have different latency requirements. Therefore, how to reduce latency of traffic is a topic that is worthy of discussion.

BRIEF SUMMARY OF THE INVENTION

A data reordering method and an apparatus are provided to overcome the problems mentioned above.

An embodiment of the invention provides a data reordering method. The reordering method may be performed by a receiving apparatus. The data reordering method may include the following steps. The receiving apparatus may receive a first physical layer (PHY) protocol data unit (PPDU) from a transmitting apparatus, wherein the first PPDU comprises a plurality of medium access control (MAC) PDUs (MPDUs), and the MPDUs correspond to the same block acknowledgement (BA) window. Then, the receiving apparatus may determine a traffic that each of the MPDUs belongs to according to an MPDU identification, wherein traffics that the plurality of MPDUs belonging to comprise a first traffic and a second traffic which is different from the first traffic. Then, the receiving apparatus may perform a reordering operation for the MPDUs belonging to the first traffic, and a reordering operation for the MPDUs belonging to the second traffic, respectively. Then, the receiving apparatus may transmit a BA frame in response to the first PPDU to the transmitting apparatus, wherein the BA frame comprises information for indicating whether the MPDUs in the first PPDU have been successfully received.

An embodiment of the invention provides an apparatus for apparatus for data reordering. The apparatus includes a transceiver and a processor. The transceiver may be configured to perform wireless transmission and reception to and from a transmitting apparatus. The processor may be coupled to the transceiver. In addition the processor may be configured to receive, via the transceiver, a first physical layer (PHY) protocol data unit (PPDU) from the transmitting apparatus, wherein the first PPDU comprises a plurality of medium access control (MAC) PDUs (MPDUs), wherein the MPDUs correspond to the same block acknowledgement (BA) window, determine a traffic that each of the MPDUs belongs to according to an MPDU identification, wherein traffics that the plurality of MPDU belonging to comprise a first traffic and a second traffic which is different from the first traffic, perform a reordering operation for the MPDUs belonging to the first traffic, and a reordering operation for the MPDUs belonging to the second traffic, respectively, and transmit, via the transceiver, a BA frame in response to the first PPDU to the transmitting apparatus, wherein the BA frame comprises information for indicating whether the MPDUs in the first PPDU have been successfully received.

Other aspects and features of the invention will become apparent to those with ordinary skill in the art upon review of the following descriptions of specific embodiments of the data reordering method and the apparatus.

BRIEF DESCRIPTION OF THE DRAWINGS

The present disclosure will become more fully understood by referring to the following detailed description with reference to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
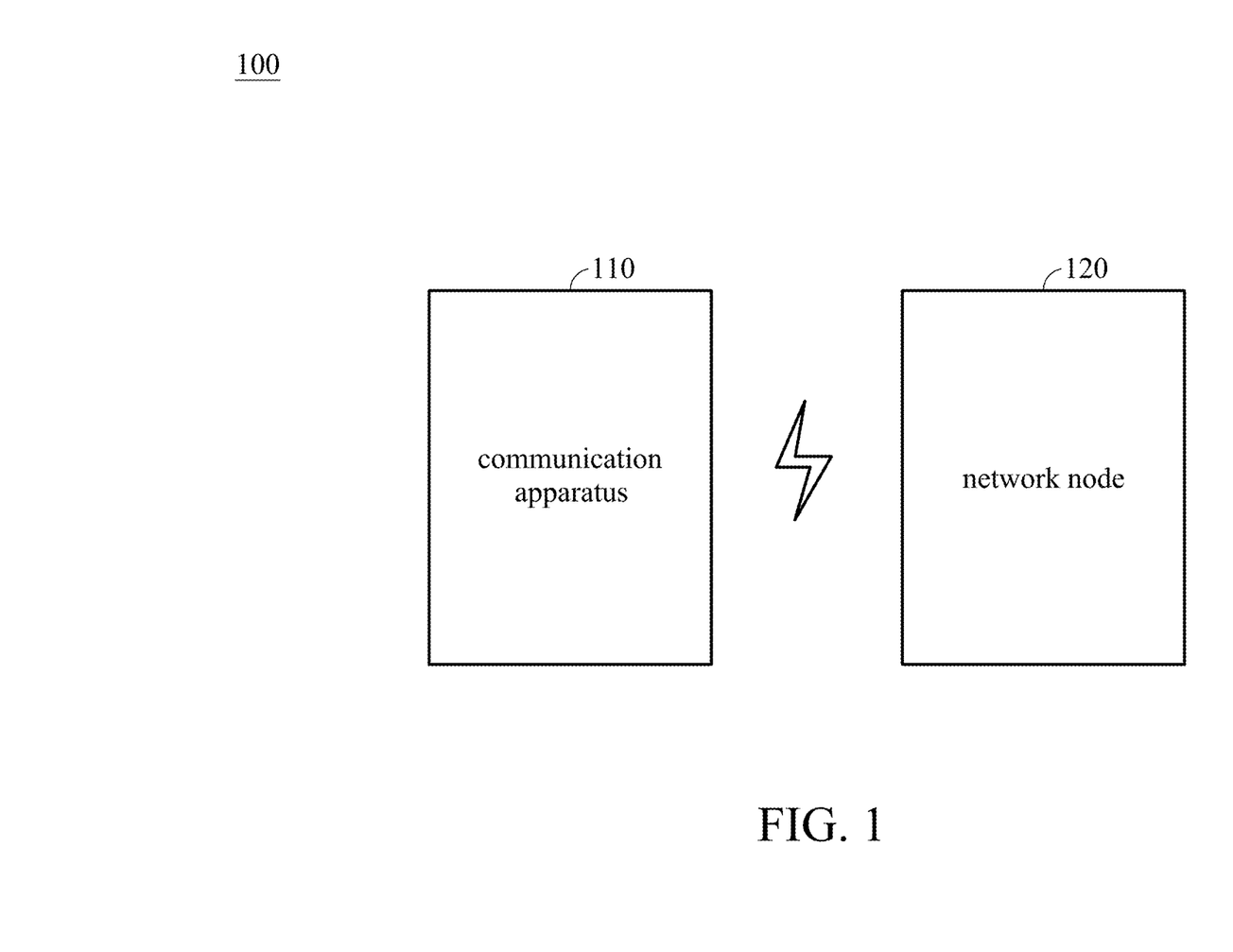
FIG. 1 is a block diagram of a wireless communication system 100 according to an embodiment of the present disclosure.

FIG. 1 is a block diagram of a wireless communication system 100 according to an embodiment of the present disclosure. As shown in FIG. 1, the wireless communication system 100 may comprise a communication apparatus 110 and a network node 120. The network node 120 may be an entity compatible with the Institute of Electrical and Electronics Engineers (IEEE) 802.11 standards to provide and manage the access to the wireless medium for the communication apparatus 110. It should be noted that, in order to clarify the concept of the invention, FIG. 1 presents a simplified block diagram in which only the elements relevant to the invention are shown. However, the invention should not be limited to what is shown in FIG. 1. For example, the wireless communication system 100 may comprise other communication apparatuses.

In an embodiment of the present disclosure, the communication apparatus 110 may be a user equipment (UE), a non-AP station (STA), a repeater, a mobile phone (e.g., feature phone or smartphone), a panel Personal Computer (PC), a laptop computer, or any computing device, as long as it is compatible with the same IEEE 802.11 standards as the network node 120. The communication apparatus 110 may associate and communicate with the network node 120 to send or receive an uplink (UL) or downlink (DL) Physical layer Protocol Data Unit (PPDU).

In an embodiment of the present disclosure, the network node 120 may be an Extremely High Throughput (EHT) AP which is compatible with the IEEE 802.11be standards. In another embodiment of the invention, the network node 120 may be an AP which is compatible with any IEEE 802.11 standards later than 802.11be.

Figure 2:
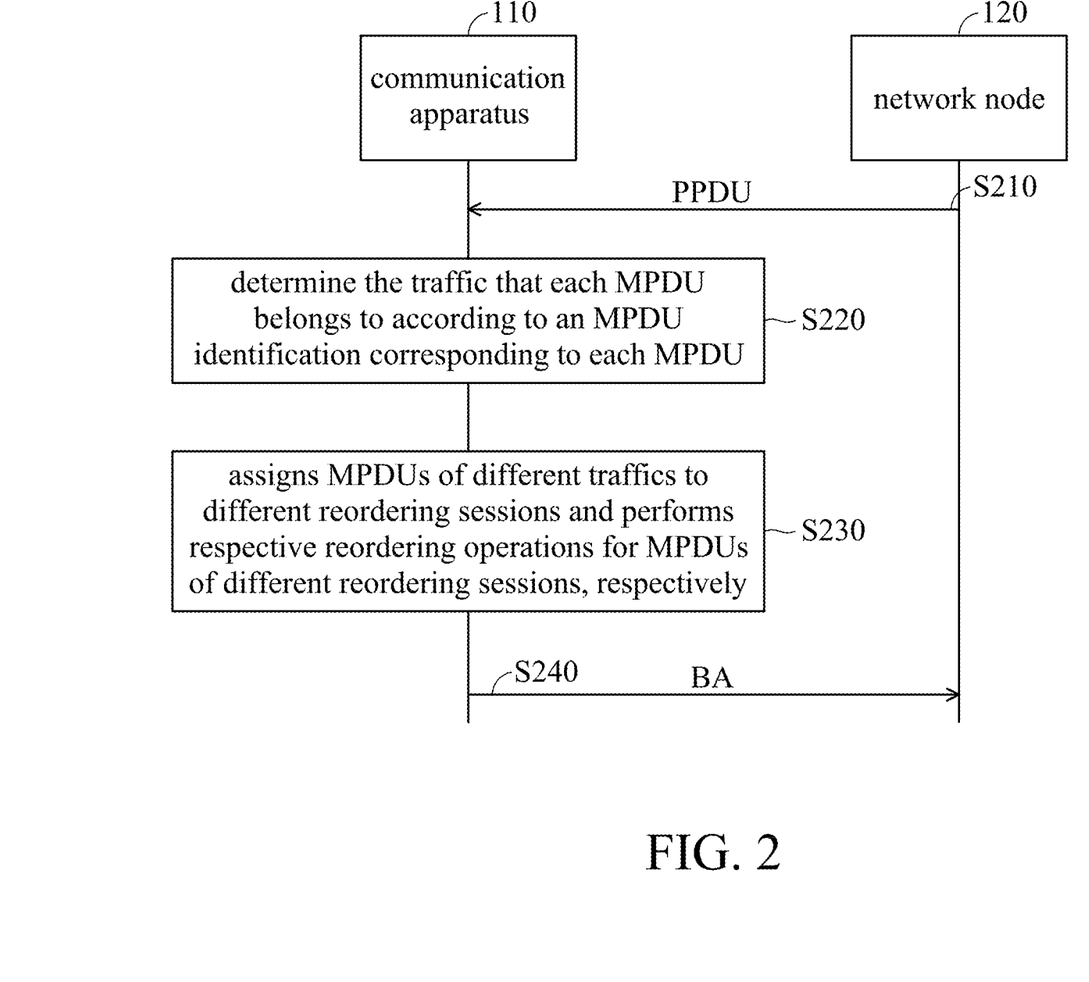
FIG. 2 is a flow chart illustrating a data reordering method according to an embodiment of the present disclosure.

FIG. 2 is a flow chart illustrating a data reordering method according to an embodiment of the present disclosure. The data reordering method can be applied to the wireless communication system 100.

In step S210, the communication apparatus 110 of the wireless communication system 100 may receive a physical layer (PHY) protocol data unit (PPDU) from the network node 120 of the wireless communication system 100, wherein the PPDU comprises a plurality of medium access control (MAC) PDUs (MPDUs) and MPDU identification for identifying a traffic to which each MPDU belongs, and the MPDUs correspond to the same block acknowledgement (BA) window.

The MPDU identification may comprise information carried in one field or a combination of multiple fields of an Internet Protocol (IP) header of each MPDU in the PPDU sent from the network node 120, wherein the multiple fields may be 5-tuple. Alternatively, the MPDU identification may comprise information carried in a type of service (TOS) and differentiated services code point (DSCP) field of the IP header of each MPDU in the PPDU sent from the network node 120. The MPDU identification indicates the traffic to which each MPDU belongs. Alternatively, the MPDU identification may comprise information carried in the preamble of the PPDU. The MPDU identification is used to indicate the traffic to which all MPDUs in the PPDU belong. Alternatively, the MPDU identification may comprise information carried in the preamble of the PPDU. The MPDU identification is used to indicate the traffic to which all MPDUs in the PPDU belong. Alternatively, the MPDU identification may comprise information carried in MAC header of the PPDU (e.g., SCS ID, and/or A-ctrl field). The MPDU identification is used to indicate the traffic to which all MPDUs in the PPDU belong.

Alternatively, the MPDU identification may comprise information carried in a descriptor sent from the network node 120, rather than being carried in the PPDU in step 210. The MPDU identification may indicate the traffic to which the entire PPDU belongs. In this case, all MPDUs carried within the PPDU belong to the traffic. Alternatively, the MPDU identification may indicate the traffic to which each MPDU belongs.

Alternatively, the MPDU identification is used to indicate the range of sequence numbers (SNs) corresponding to different traffics, which are negotiated between the communication apparatus 110 and the network node 120 before the PPDU is received.

In step S220, the communication apparatus 110 may determine the traffic that each MPDU belongs to according to an MPDU identification corresponding to each MPDU, e.g., voice traffic, video streaming traffic, but the present disclosure should not be limited thereto.

In step S230, the communication apparatus 110 assigns MPDUs of different traffics to different reordering sessions and performs reordering operations for MPDUs of different reordering sessions, respectively. In some embodiments, the different traffics may comprise at least two different traffics, such as, a first traffic and a second traffic.

In this step S230, the MPDUs belonging to a first traffic are assigned to a first reordering session, and the MPDUs belonging to a second traffic are assigned to a second reordering session. The communication apparatus 110 performs reordering operations for the first reordering session and the second reordering session, respectively. With this arrangement, the communication apparatus 110 performs reordering operations for the MPDUs belonging to the first traffic and the MPDUs belonging to the second traffic, respectively.

According to an embodiment of the present disclosure, a second traffic has low latency requirement, and a first traffic has normal latency requirement or high latency requirement. The network node 120 may transmit different traffics in the PPDU by using different MCSs, wherein different MCSs may correspond to different data rates. Therefore, different traffics are sent in different data rates based on their corresponding MCSs. Higher data rate may result in higher packet error rate (PER). Lower data rate may result in lower packet error rate (PER) or in some cases, have no PER.

According to an embodiment of the present disclosure, the different traffics in the PPDU are associated with the same BA agreement. Because the different traffics in the PPDU are associated with the same BA agreement, the different traffics correspond to the same BA window and the same bitmap. The BA window corresponds to a range of sequence numbers, which indicate that the MPDUs with sequence numbers within this range are the MPDUs expected to be received. Each bit of a plurality of bits in the bitmap may be set to 0 or 1 to indicate whether corresponding MPDU has been successfully received or not. Once a MPDU in the range of sequence numbers is received successfully, the BA window can move forward. The BA window can stop at the initial MPDU which has not received successfully. Each traffic corresponds to its own last-arrived-sequence number (SN). The last-arrived-SN corresponding to a traffic indicates the sequence number of the last MPDU of MPDUs which have arrived consecutively in order and have been received successfully. All MPDUs of the traffic preceding the last-arrived-sequence number corresponding to the traffic are pushed to the next MAC process.

In addition, if there is at least one frame check sequence (FCS) error in the first traffic and no FCS error in the second traffic (e.g., the second traffic may be sent in a modulation coding schemes (MCS) corresponding to a lower data rate), the communication apparatus 110 may buffer the MPDUs (corresponding to the first traffic) whose SNs are later than the first last-arrived-SN corresponding to the first traffic in a reordering buffer. That is, the continuous MPDUs (corresponding to the first traffic) whose SNs are prior than or corresponds to the first last-arrived-SN and the continuous MPDUs (corresponding to the second traffic) whose SNs are prior than or corresponds to the second last-arrived-SN corresponding to the second traffic may be pushed to the next MAC process (e.g., de-Aggregation Mac Service Data Unit (A-MSDU) operation). Because there may be no FCS error in the second traffic, the second last-arrived-SN corresponding to the second traffic can be initialed to be a SN of an initial MPDU belonging to the second traffic in the PPDU. The second last-arrived-SN is updated synchronously along with the successful reception of consecutive MPDUs belonging to the second traffic.

In step S240, the communication apparatus 110 transmits a block acknowledgement (BA) frame in response to the PPDU to the network node 120, wherein the BA comprises information are used for indicating which MPDUs have been successfully received.

According to an embodiment of the present disclosure, if a PPDU (e.g., multi-layer PPDU) may comprise MPDUs belonging to a first traffic and MPDUs belonging to a second traffic, the BA frame may comprise the receiving results corresponding to MPDUs belonging to the first traffic and the receiving results corresponding to MPDUs belonging to the second traffic. The BA frame may comprise a bitmap, each bit of a plurality of bits in the bitmap may be set to 0 or 1 to indicate whether corresponding MPDU has been successfully received or not. When the network node 120 receives the BA frame, the network node 120 may know which MPDUs need to be re-transmitted to the communication apparatus 110.

According to an embodiment of the present disclosure, the communication apparatus 110 may receive the next PPDU from the network node 120 and the next PPDU only comprises the MPDUs belonging to the first traffic. In this embodiment, the communication apparatus 110 may perform a reordering operation for the MPDUs belonging to the first traffic. The next PPDU may comprise the MPDUs which need to be re-transmitted for the first traffic. Then, the communication apparatus 110 may transmit the receiving result of the first traffic and the receiving result of the second traffic to the network node 120 through another BA frame. Because the first traffic and the second traffic are associated with the same BA window, the second last-arrived-SN corresponding to the second traffic is synchronized with the updated first last-arrived-SN corresponding to the first traffic.

According to another embodiment of the present disclosure, the communication apparatus 110 may receive the next PPDU from the network node 120 and the next PPDU may comprise the MPDUs belonging to the first traffic and the MPDUs belonging to the second traffic. In this embodiment, the communication apparatus 110 may reorder the MPDUs belonging to the first traffic and reorder the MPDUs belonging to the second traffic, respectively. The MPDUs belonging to the first traffic in the next PPDU may comprise the MPDUs which need to be re-transmitted for the first traffic. Then, the communication apparatus 110 may transmit the receiving result of the first traffic and the receiving result of the second traffic to the network node 120 through another BA frame. In the embodiment, the SNs of the MPDUs of the first traffic may be prior to the SNs of the MPDUs of the second traffic. Therefore, the communication apparatus 110 may determine the initial second last-arrived-SN corresponding to the second traffic based on the first last-arrived-SN corresponding to the first traffic first. Then, the communication apparatus 110 may determine the updated second last-arrived-SN corresponding to the second traffic based on the SN of an initial MPDU in the MPDUs of the second traffic. Then, the second last-arrived-SN corresponding to the second traffic may be updated synchronously along with the successful reception of consecutive MPDUs belonging to the second traffic.

Figure 3:
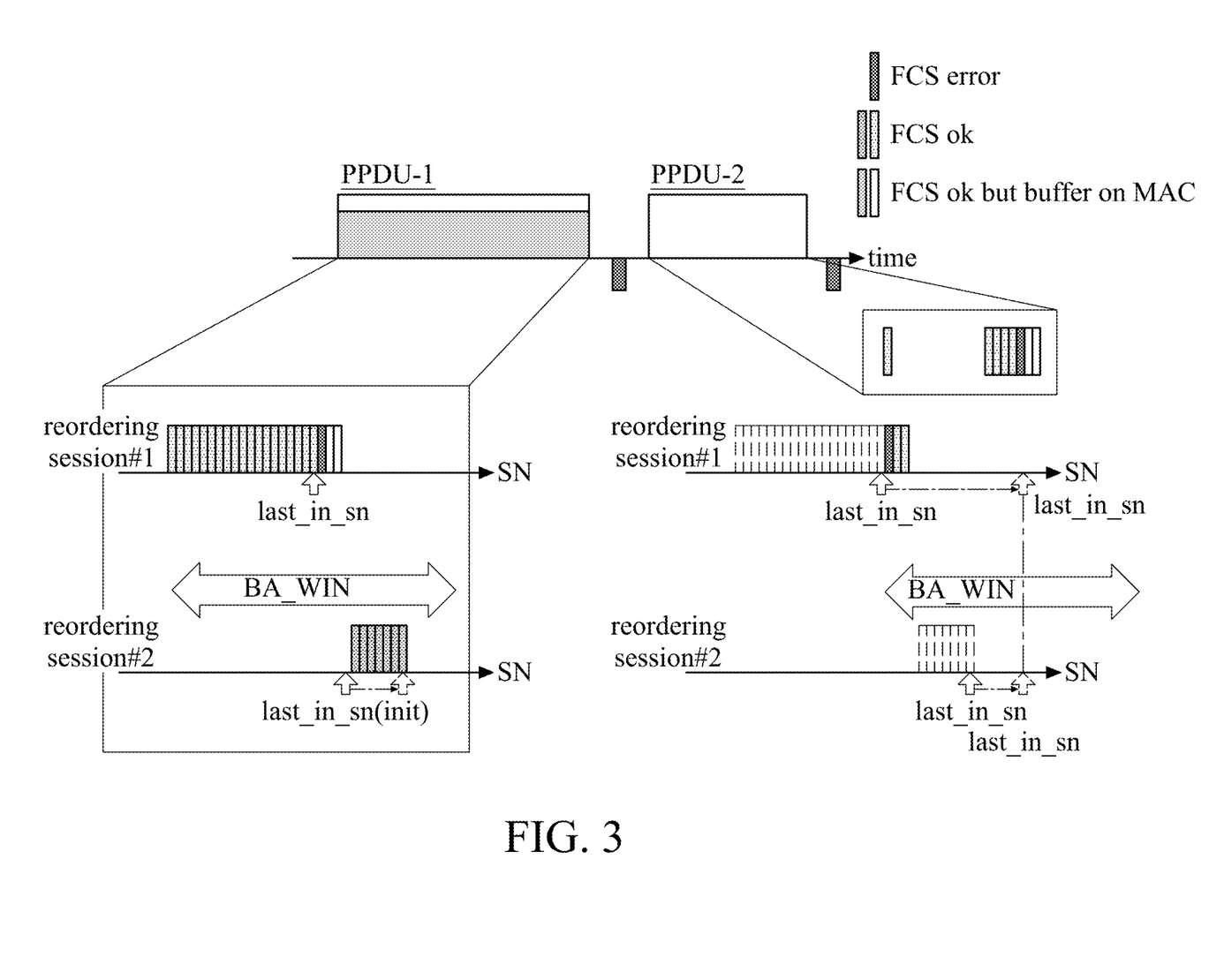
FIG. 3 is a schematic diagram illustrating reordering sessions according to an embodiment of the present disclosure.

FIG. 3 is a schematic diagram illustrating a reordering procedure according to an embodiment of the present disclosure. As shown in FIG. 3, the communication apparatus 110 receives the PPDU-1 from the network node 120. The PPDU-1 may comprise the MPDUs of the first traffic corresponding to the first reordering session #1 and the MPDUs of the second traffic corresponding to the second reordering session #2. The first reordering session #1 and the second reordering session #2 are associated with the same BA window BA_WIN. Each PPDU in the present disclosure may correspond to four spatial streams (SSs), but the present disclosure should not be limited thereto. For example, in PPDU-1, the first traffic may correspond to one spatial stream (SS) and the second traffic may correspond to three SSs. It is assumed that the second traffic is sent with lower data rate, i.e., there may be no FCS error in the second traffic.

As shown in FIG. 3, if there is an FCS error in the first traffic and no FCS error in the second traffic, the communication apparatus 110 may determine that the last-arrived-SN corresponding to the first reordering session is the SN (i.e., last_in_sn of the first reordering session) which is prior to the MPDU with the FCS error. In addition, in the embodiment, the communication apparatus 110 may buffer the MPDUs whose SNs are later than the last-arrived-SN (i.e., last_in_sn of the first reordering session) corresponding to the first reordering session in the reordering buffer. For example, the communication apparatus 110 receives MDPUs with SN 1-23 belonging to the first traffic 1. It does not successfully receive the MPDU with SN 21 and receives the MPDU with SN 22 and MPDU with SN 23. Therefore, the MPDU with SN 22 and the MPDU with SN 23 are buffered, and the last_in_sn1=20 is recorded for the first reordering session corresponding to the first traffic. In addition, the communication apparatus 110 may determine the initial last-arrived-SN (i.e., last_in_sn (init)) corresponding to the second reordering session based on the first SN (initial SN) of the MPDUs of the second traffic. Because the second traffic has no FCS, the final last-arrived-SN corresponding to the second reordering session equals to the last SN of the consecutive MPDUs of the second traffic. For example, MPDUs with SN 24-30 are received and the last-arrived-SN corresponding to the second reordering session is synchronously updated to 30. The first last-arrived-SN corresponding to the first traffic in the embodiment corresponding to FIG. 2 is the last-arrived-SN corresponding to the first reordering session. The second last-arrived-SN corresponding to the second traffic in the embodiment corresponding to FIG. 2 is the last-arrived-SN corresponding to the second reordering session.

As shown in FIG. 3, the communication apparatus 110 receives the next PPDU (i.e., PPDU-2) from the network node 120. The PPDU-2 may only comprise the MPDUs of the first traffic corresponding to the first reordering session #1. As shown in the right part of FIG. 3, a starting position of the BA window is at the first (or initial) MPDU that has not been successfully received. In addition, the PPDU-2 may comprise the MPDU which is re-transmitted for the MPDU with FCS error in the PPDU-1. The communication apparatus 110 reorders the re-transmitted MPDU and the buffered MPDUs and updates the first last-arrived-SN based on the SNs of the buffered MPDUs. When receiving a MPDU of the first traffic in the PPDU-2 whose SN is after the SN of the buffered MPDUs, the communication apparatus 110 may update the last-arrived-SN corresponding to the first reordering session based on the MPDU of the first traffic in the PPDU-2 whose SN is after the SN of the buffered MPDUs and the last-arrived-SN corresponding to the second reordering session. If there is an FCS error in the first traffic in PPDU-2, the communication apparatus 110 may update the last-arrived-SN corresponding to the first reordering session to be the SN which is prior to the MPDU with the FCS error of the first traffic in PPDU-2. In addition, because the first reordering session and the second reordering session are associated with the same BA window, the last-arrived-SN corresponding to the second reordering session is synchronized with the updated last-arrived-SN corresponding to the first reordering session (i.e., the last-arrived-SN corresponding to the second reordering session is also updated).

For example, the communication apparatus 110 receives a MPDU with SN 21 belonging to the first traffic 1. The MPDU with SN 21 and the previously buffered MPDUs with SNs 22 and 23 may be pushed to the next MAC process. The communication apparatus 110 synchronously updates the last_in_sn to be last_in_sn=23. When the communication apparatus 110 receives a MPDU with SN 31 belonging to the traffic 1, the communication apparatus 110 may update the last_in_sn corresponding to the first reordering session based on the last_in_sn=30 corresponding to the second reordering session and the SN 31 of the latest MPDU corresponding to the first traffic. The communication apparatus 110 may find the SN 31 of the latest MPDU corresponding to the first traffic is the next SN after the last_in_sn=30, and update the last_in_sn corresponding to the first reordering session to be 31. The MPDUs with the SNs 32, 33, and 34 are subsequently received in order, the last_in_sn corresponding to the first reordering session is synchronously updated to last_in_sn=34. In addition, because the first traffic and the second traffic are associated with the same BA window, the last-arrived-SN corresponding to the second reordering session is synchronized with the updated last-arrived-SN corresponding to the first reordering session. For example, the last-arrived-SN corresponding to the second reordering session is also updated to be last_in_sn=34.

Alternatively, the communication apparatus 110 may update the last-arrived-SN corresponding to the first reordering session based on the bitmap which indicates whether MPDUs belonging to the BA window have been received successfully. For example, after the PPDU-1 is received, the last-arrived-SN corresponding to the first reordering session is SN 20, the last-arrived-SN corresponding to the second reordering session is SN 30, and the size of the BA window is 200. In the bitmap, the bitmap comprises a series of bits for indicating whether the MPDUs belonging to the BA window have been received successfully. A bit corresponding to SN 21 is 0, bits corresponding to SNs 22-30 are 1, and bits corresponding to SNs 31-200 are 0. The communication apparatus 110 receives the MPDU with SN 21 and updates the last-arrived-SN corresponding to the first reordering session to be SN 21. The communication apparatus 110 may determine that SNs 22-30 are successfully received based on the bitmap and update the last-arrived-SN corresponding to the first reordering session to be 30. The communication apparatus 110 may receive MPDUs with SNs 31, 32, 33, and 34 in order. The last_in_sn corresponding to the first reordering session is synchronously updated to last_in_sn=34.

Figure 4:
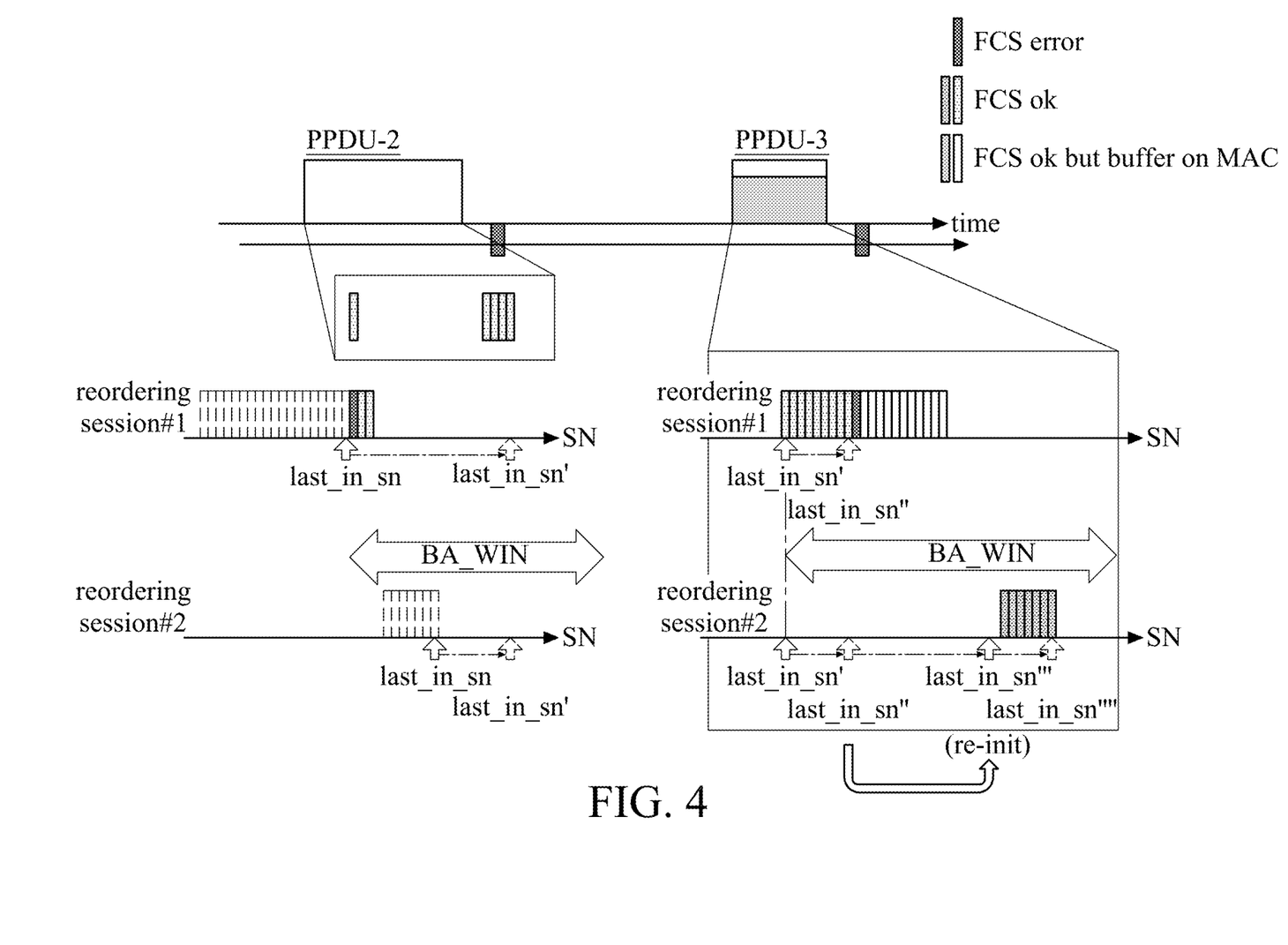
FIG. 4 is a schematic diagram illustrating reordering sessions according to another embodiment of the present disclosure.

FIG. 4 is a schematic diagram illustrating reordering procedure according to another embodiment of the invention. As shown in FIG. 4, the communication apparatus 110 receives the next PPDU (i.e., PPDU-3) after PPDU-2 from the network node 120. The PPDU-3 may comprise the MPDUs of the first traffic corresponding to the first reordering session #1 and the MPDUs of the second traffic corresponding to the second reordering session #2.

As shown in FIG. 4, if there is no FCS error in the first traffic for PPDU-2, the last-arrived-SN corresponding to the first reordering session for PPDU-2 may be last_in_sn' of the first reordering session for PPDU-2. If there is an FCS error in the first traffic and no FCS error in the second traffic for PPDU-3, the last-arrived-SN corresponding to the first reordering session is updated synchronously along with the successful reception of consecutive MPDUs of the first traffic. The last-arrived-SN corresponding to the first reordering session may be updated to be the SN (i.e., last_in_sn" of the first reordering session) which is prior to the MPDU with FCS error.

In addition, the communication apparatus 110 may determine that the updated last-arrived-SN corresponding to the second reordering session is the last SN (i.e., last_in_sn"" of the second reordering session) of the MPDUs of the second traffic. Specifically, the communication apparatus 110 may determine the initial last-arrived-SN corresponding to the second reordering session based on the last-arrived-SN corresponding to the first reordering session first (i.e., the last-arrived-SN corresponding to the second reordering session is changed from last_in_sn' to last_in_sn" first). Then, the communication apparatus 110 may determine the updated initial (i.e., re-init) last-arrived-SN (i.e., last_in_sn'" of the second reordering session) corresponding to the second reordering session based on the first SN (initial SN) of the MPDUs of the second traffic (i.e., the last-arrived-SN corresponding to the second reordering session is updated to last_in_sn'"), and the last-arrived-SN corresponding to the second reordering session is updated synchronously along with the successful reception of consecutive MPDUs of the second traffic. The final updated last-arrived-SN (i.e., last_in_sn"" of the second reordering session) corresponding to the second reordering session is obtained based on the last SN of the MPDUs of the second traffic. In addition, in the embodiment, the communication apparatus 110 may buffer the MPDUs of the first traffic in the PPDU-2 whose SNs are later than the last-arrived-SN (i.e., last_in_sn") corresponding to the first reordering session in the reordering buffer.

Figure 5:
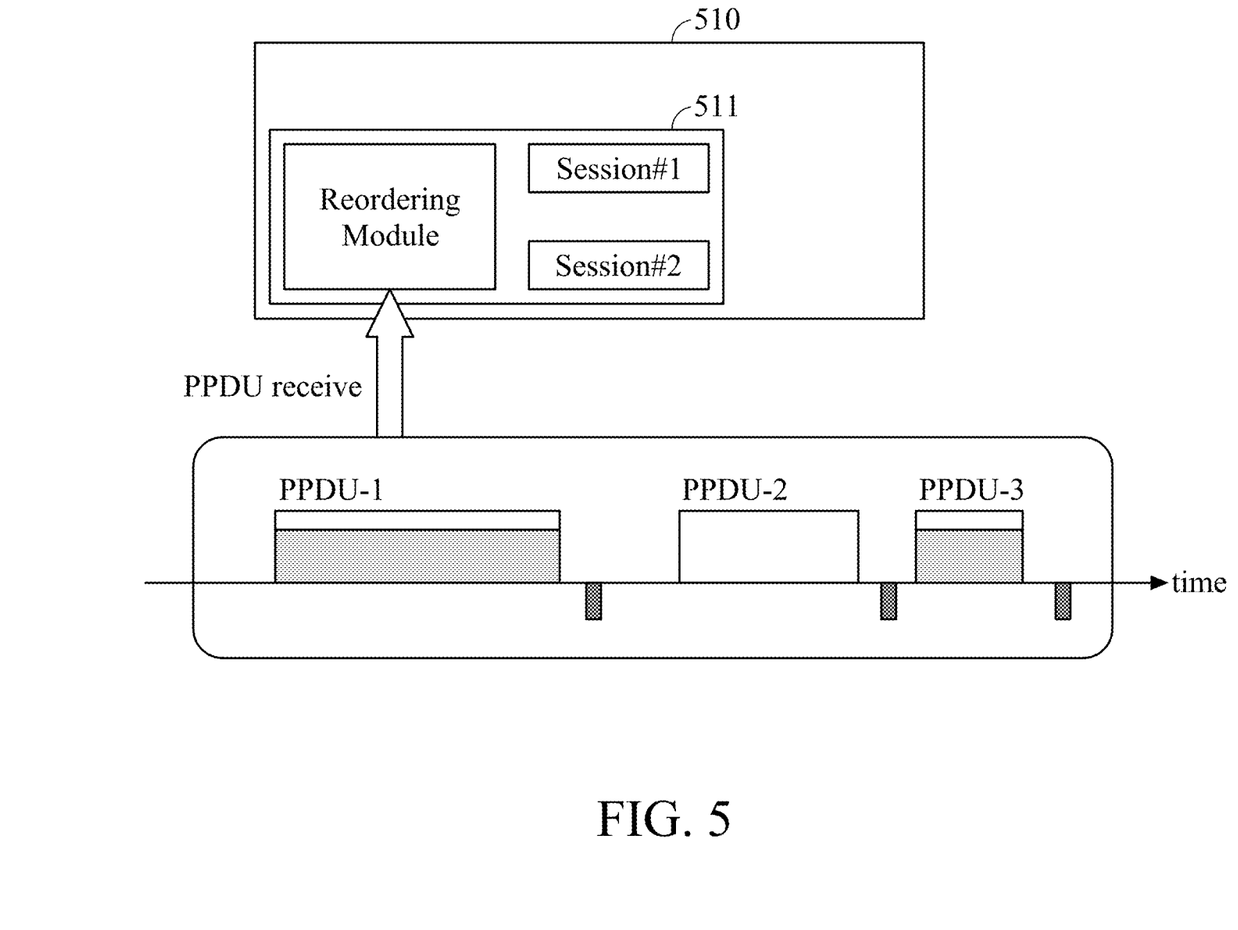
FIG. 5 is a schematic diagram illustrating a single-chip architecture.

The data reordering method may be implemented in a single-chip architecture. In the single-chip architecture, the data reordering method may be implemented by one chip. FIG. 5 is a schematic diagram illustrating a single-chip architecture according to an embodiment of the present disclosure. As shown in FIG. 5, the communication apparatus 510 may comprise a chip 511. The chip 511 may receive the PPDU-1, the PPDU-2 and the PPDU-3 and performing reordering operations as illustrated in FIG. 3 and FIG. 4. The reordering operations in the chip 511 may be performed by the reordering module of the chip 511.

Figure 6:
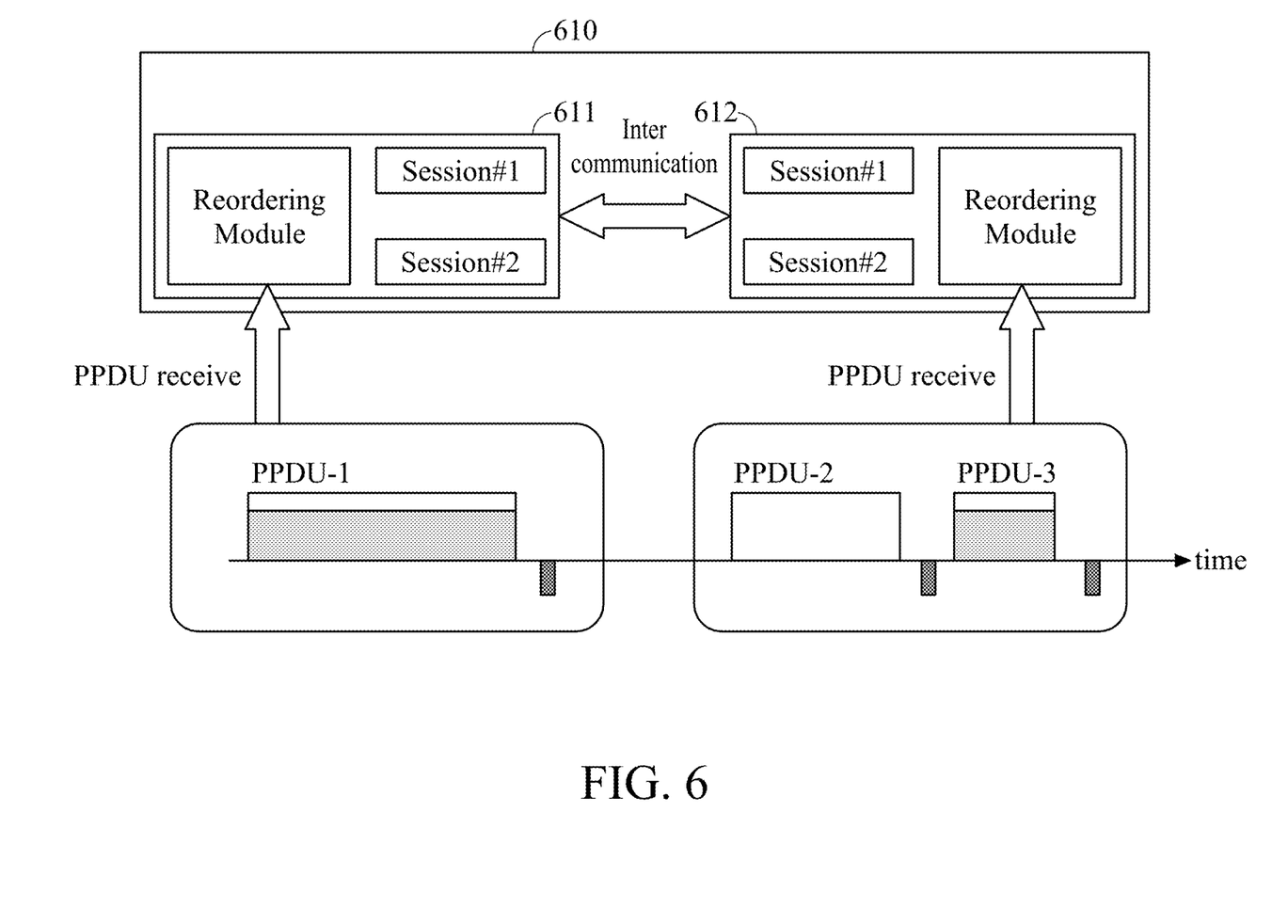
FIG. 6 is a schematic diagram illustrating a multi-chip architecture.

The data reordering method may be implemented in a multi-chip architecture. In the multi-chip architecture, the data reordering method may be implemented by multiple chips. FIG. 6 is a schematic diagram illustrating a multi-chip architecture according to an embodiment of the invention. As shown in FIG. 6, the communication apparatus 610 may comprise a chip 611 and a chip 612. In the communication apparatus 610, one chip can may operation in a 2G band and a 5G band, and the other chip can may operation in 6G.

For example, the chip 611 receives the PPDU-1 in a 5G band, and the chip 612 receives the PPDU-2 and PPDU-3 in a 6G band. After performing reordering operations for different traffics in the PPDU-1, respectively, the chip 611 may transmit information required for reordering a following PPDU. The information comprises the last-arrived-SN corresponding to the first reordering session, the last-arrived-SN corresponding to the second reordering session, and a bitmap, wherein the bitmap indicates whether the MPDUs belonging to the BA window have been received successfully. The information further comprises a size of BA window. The chip 2 receives the information required for reordering the following PPDU. The chip 2 receives PPDU-2 and processes the PPDU-2 by using the information required for reordering the PPDU-2.

For example, the last-arrived-SN corresponding to the first reordering session is SN 20, the last-arrived-SN corresponding to the second reordering session is SN 30, and the maximum size of the BA window is 200. In the bitmap, the bitmap comprises a series of bits for indicating whether MPDUs belonging to the BA window have been received successfully. A bit corresponding to SN 21 is 0, bits corresponding to SN 22-30 are 1, and bits corresponding to SN 31-200 are 0. The chip 612 may receive the MPDU with SN 21 and find SNs 22-30 are successfully received by the chip 611 based on the bitmap. The chip 612 may update the last-arrived-SN corresponding to the first reordering session to be 30 based on the bitmap. The chip 612 may receive MPDUs with SNs 31, 32, 33, and 34 in order. The last_in_sn corresponding to the first reordering session is synchronously updated to last_in_sn=34. In addition, because the first traffic and the second traffic are associated with the same BA window, the last-arrived-SN corresponding to the second reordering session is synchronized to last_in_sn=34.

The reordering operations in the chip 611 may be performed by the reordering module of the chip 1, and the reordering operations in the chip 612 may be performed by the reordering module of the chip 612.

Alternatively, an AP can perform the data reordering operations. The AP can receive an PPDU, and perform reordering operations for MPDUs of different reordering sessions, respectively. The above reordering method also apply to the AP.

Figure 7:
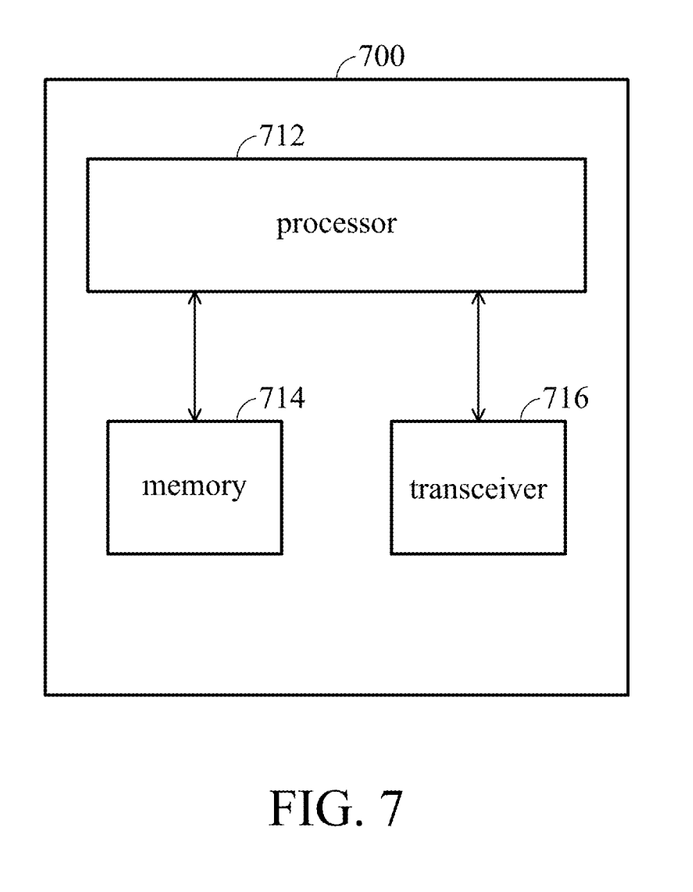
FIG. 7 is a block diagram of a communication apparatus 700 according to an embodiment of the present disclosure.
Figure 8:
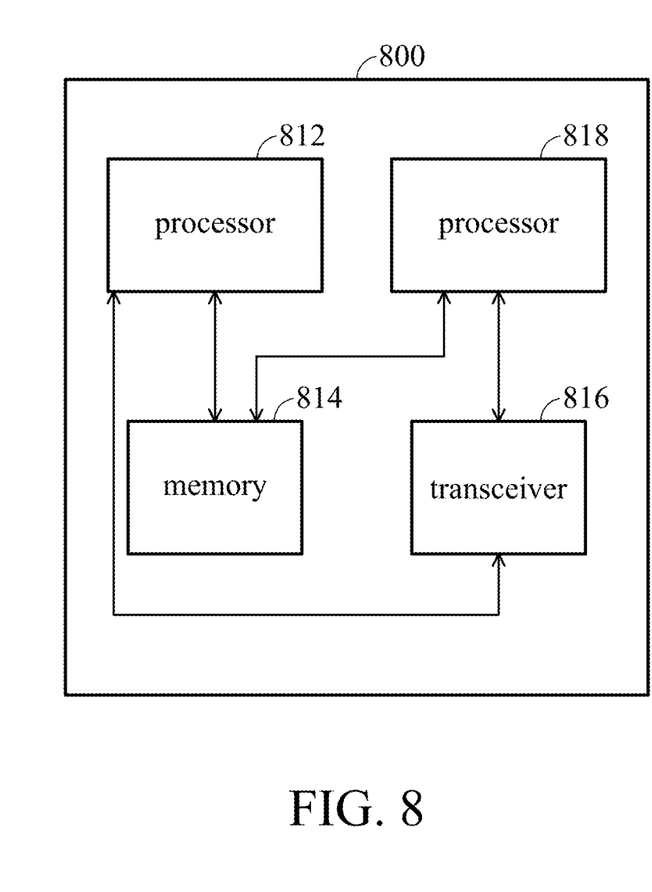
FIG. 8 is a block diagram of a communication apparatus 800 according to an embodiment of the present disclosure.

FIG. 7 illustrates an example apparatus 700 in accordance with an implementation of the present disclosure. FIG. 8 illustrates an example apparatus 800 in accordance with another implementation of the present disclosure. The apparatus 700 and apparatus 800 may perform various functions to implement schemes, techniques, processes and methods described herein pertaining to reordering operation. For instance, the apparatus 700 and apparatus 800 may be implemented in a STA or a AP.

The apparatus 700 and apparatus 800 may be a part of an electronic apparatus, such as a portable or mobile apparatus, a wearable apparatus, a wireless communication apparatus or a computing apparatus. When implemented in a STA, the apparatus 700 may be implemented in a smartphone, a smart watch, a personal digital assistant, a digital camera, or a computing equipment such as a tablet computer, a laptop computer or a notebook computer. When implemented in or as a network apparatus, the apparatus 700 and apparatus 800 may be implemented in a network node, such as an AP in a WLAN.

The apparatus 700 may include at least some of those components shown in FIG. 7 such as a processor 712. In some implementations, the apparatus 700 may also include a transceiver 716 coupled to processor 712. Transceiver 716 may include a transmitter capable of wirelessly transmitting and a receiver capable of wirelessly receiving data. It is noteworthy that, although the transceiver 716 are illustrated as being external to and separate from processor 712, respectively, in some implementations, transceiver 716 may be an integral part of processor 712 as a system on chip (SoC). In some implementations, the apparatus 700 may further include a memory 714 coupled to processor 712 and capable of being accessed by processor 712 and storing data therein. The apparatus 700 may further include one or more other components not pertinent to the proposed scheme of the present disclosure (e.g., internal power supply, display device and/or user interface device), and, thus, such component(s) of the apparatus 700 are neither shown in FIG. 7 nor described below in the interest of simplicity and brevity.

The apparatus 800 may include at least some of those components shown in FIG. 8 such as a processor 812 and a processor 818, e.g., multi-chip architecture. In some implementations, the apparatus 800 may also include a transceiver 816 coupled to the processor 812 and a processor 818. Transceiver 816 may include a transmitter capable of wirelessly transmitting and a receiver capable of wirelessly receiving data. It is noteworthy that, although the transceiver 816 are illustrated as being external to and separate from the processor 812 and the processor 818, respectively, in some implementations, the transceiver 816 may be an integral part of the processor 812 and/or the processor 818. In some implementations, the apparatus 800 may further include a memory 814 coupled to the processor 812 and the processor 818 and capable of being accessed by the processor 812 and the processor 818 and storing data therein. The apparatus 800 may further include one or more other components not pertinent to the proposed scheme of the present disclosure (e.g., internal power supply, display device and/or user interface device), and, thus, such component(s) of the apparatus 800 are neither shown in FIG. 8 nor described below in the interest of simplicity and brevity.

In one aspect, the processor 712, the processor 812 and the processor 818 may be implemented in the form of one or more single-core processors, one or more multi-core processors, one or more RISC processors or one or more CISC processors. That is, even though a singular term "a processor" is used herein to refer to the processor 712, the processor 812 or the processor 818, the processor 712, the processor 812 or the processor 818 may include multiple processors in some implementations and a single processor in other implementations in accordance with the present disclosure. In another aspect, the processor 712, the processor 812 or the processor 818 may be implemented in the form of hardware (and, optionally, firmware) with electronic components including, for example and without limitation, one or more transistors, one or more diodes, one or more capacitors, one or more resistors, one or more inductors, one or more memristors and/or one or more varactors that are configured and arranged to achieve specific purposes in accordance with the present disclosure.

Each of memory 714 and memory 814 may include a type of random-access memory (RAM) such as dynamic RAM (DRAM), static RAM (SRAM), thyristor RAM (T-RAM) and/or zero-capacitor RAM (Z-RAM). Alternatively, or additionally, each of memory 714 and memory 724 may include a type of read-only memory (ROM) such as mask ROM, programmable ROM (PROM), erasable programmable ROM (EPROM) and/or electrically erasable programmable ROM (EEPROM).

According to the embodiment, in the apparatus 700, the processor 712 may receive, via a transceiver, a first PPDU from a network node, wherein the first PPDU comprises a plurality of MPDUs, and the MPDUs correspond to the same block acknowledgement (BA) window, and determine the traffic that each MPDU belongs to according to an MPDU identification, and perform reorder operations for MPDUs of different traffic, respectively, and transmit a block acknowledgement (BA) frame in response to the first PPDU to the network node, wherein the BA frame comprises information for indicating whether MPDUs in the first PPDU have been successfully received. According to the embodiment, the processor 712 may further perform other operations shown in FIG. 2-FIG. 4.

According to the embodiment, in the apparatus 800, the processor 812 may receive, via a transceiver, a first PPDU from a network node, wherein the PPDU comprises a plurality of MPDUs, and the MPDUs correspond to the same BA window, and determine the traffic that each MPDU belongs to according to an MPDU identification, and perform reorder operations for MPDUs of different traffic, respectively, and transmit a BA frame in response to the PPDU to the network node, wherein the BA frame comprises information for indicating whether MPDUs in the PPDU have been successfully received. The processor 812 transmits information required for reordering a following PPDU to the processor 818. The information comprises the last-arrived-SN corresponding to the first reordering session, the last-arrived-SN corresponding to the second reordering session, and a bitmap, wherein the bitmap indicates whether MPDUs belonging to the BA window have been received successfully. The information further comprises a size of BA window. The processor 818 receives the next PPDU and reorder the next PPDU by using the information required for reordering the next PPDU, wherein the step of reordering the next PPDU by using the information required for reordering the next PPDU comprises updating the first last-arrived-SN based on the bitmap. According to the embodiment, the processor 818 may further perform other operations shown in FIG. 2-FIG. 4, and FIG. 6.

Figure 9:
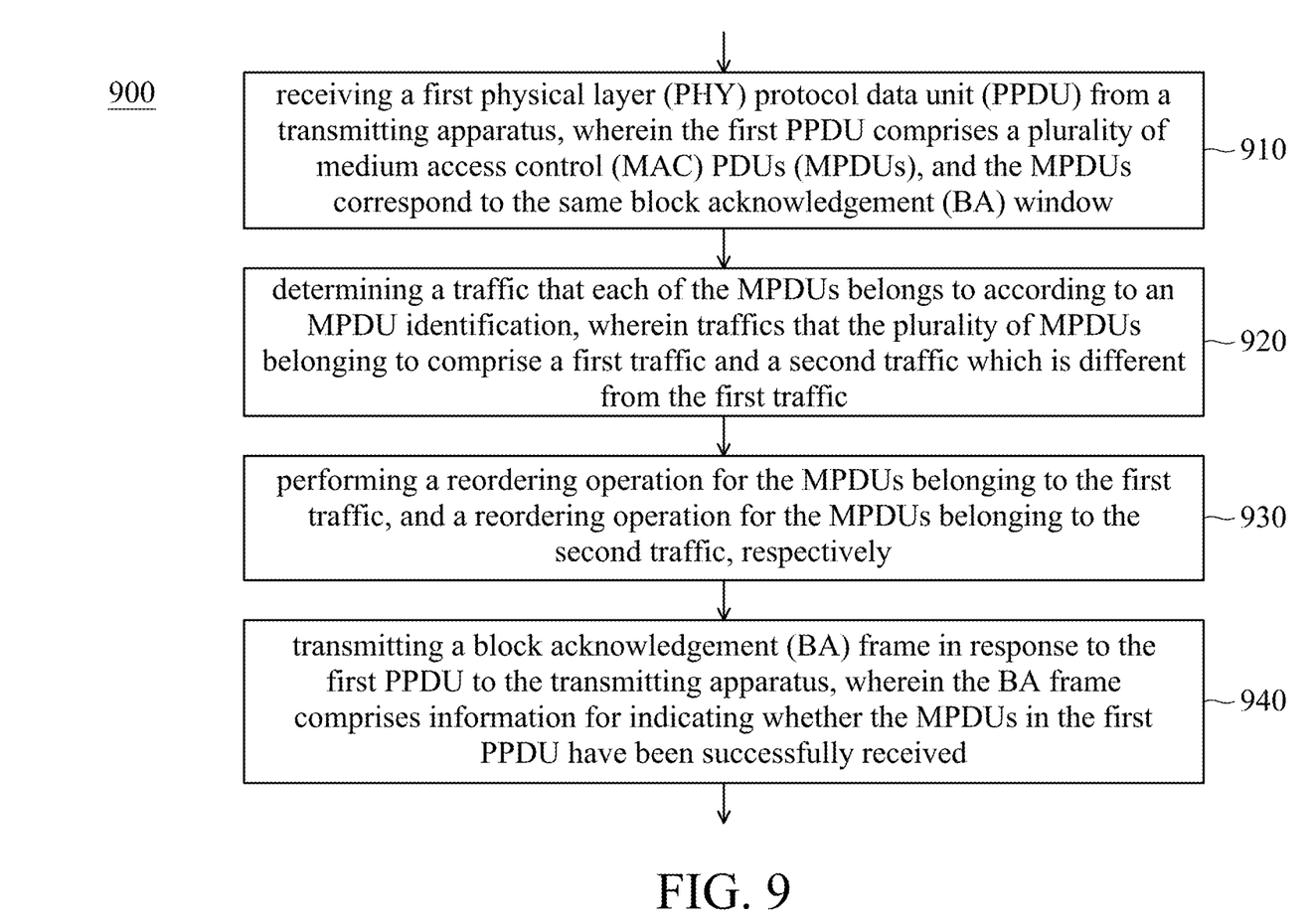
FIG. 9 is a flow chart illustrating a data reordering method according to another embodiment of the present disclosure.

FIG. 9 is a flow chart illustrating a data reordering method according to an embodiment of the present disclosure. The data reordering method can be applied to a receiving apparatus.

As shown in FIG. 9, in step S910, the receiving apparatus may receive a first physical layer (PHY) protocol data unit (PPDU) from a transmitting apparatus, wherein the first PPDU comprises a plurality of medium access control (MAC) PDUs (MPDUs), and the MPDUs correspond to the same block acknowledgement (BA) window.

In an example, the receiving apparatus and the transmitting apparatus may be the communication apparatus 110 and the network node 120 respectively. In another example, the receiving apparatus and the transmitting apparatus may be the network node 120 and the communication apparatus 110 respectively.

In step S920, the receiving apparatus may determine a traffic that each of the MPDUs belongs to according to an MPDU identification, wherein traffics that the plurality of MPDUs belonging to comprise a first traffic and a second traffic which is different from the first traffic.

In step S930, the receiving apparatus may perform a reordering operation for the MPDUs belonging to the first traffic, and a reordering operation for the MPDUs belonging to the second traffic, respectively.

In step S940, the receiving apparatus may transmit a block acknowledgement (BA) frame in response to the first PPDU to the transmitting apparatus, wherein the BA frame comprises information for indicating whether the MPDUs in the first PPDU have been successfully received.

According to an embodiment of the present disclosure, in the data reordering method, the MPDU identification comprises at least one of information carried in one field or a combination of multiple fields of an Internet Protocol (IP) header of each MPDU in the first PPDU, information carried in a type of service (TOS) and differentiated services code point (DSCP) field of the IP header of each MPDU in the first PPDU, information carried in a descriptor, information carried in a preamble of the first PPDU, and information carried in a MAC header of the first PPDU.

According to an embodiment of the present disclosure, in the data reordering method, the first traffic has a normal latency requirement or a high latency requirement and the second traffic has a low latency requirement.

According to an embodiment of the present disclosure, in the data reordering method, the MPDUs belonging to the first traffic are sent in a first modulation coding scheme (MCS) and the MPDUs belonging to the second traffic are sent in a second MCS.

According to an embodiment of present disclosure, in the data reordering method, the receiving apparatus may maintain a first last-arrived-SN corresponding to the first traffic as the last sequence number (SN) of the MPDUs of the first traffic that are prior to the MPDU with an FCS error of the first traffic if the MPDU with the FCS error of the first traffic is not received successfully, and buffer at least one MPDU of the first traffic, wherein the SN of the at least one MPDU of the first traffic is later than the first last-arrived-SN corresponding to the first traffic.

According to an embodiment of present disclosure, in the data reordering method, the receiving apparatus may reorder the MPDUs belonging to the second traffic without waiting for a retransmission of the MPDU with the FCS error of the first traffic when the MPDUs belonging to the second traffic is after the MPDU with the FCS error of the first traffic.

According to an embodiment of the present disclosure, in the data reordering method, the receiving apparatus may initialize or reinitialize a second last-arrived-SN corresponding to the second traffic to be a SN of an initial MPDU belonging to the second traffic in the first PPDU, and update the second last-arrived-SN synchronously along with the successful reception of consecutive MPDUs belonging to the second traffic.

According to an embodiment of the invention, in the data reordering method, the receiving apparatus may receive a second PPDU from the transmitting apparatus, wherein the second PPDU is the next PPDU of the first PPDU and only comprises the MPDUs belonging to the first traffic, and the MPDUs belonging to the first traffic in the second PPDU comprise a retransmitted MPDU, reorder the MPDUs in the second PPDU, and update the first last-arrived-SN based on whether the MPDUs in the second PPDU have been received successfully.

According to an embodiment of present disclosure, in the data reordering method, the first PPDU is received in a first band and the second PPDU is received in a second band, and the step of receiving the first PPDU and the step of performing a reorder operation for the MPDUs in the first PPDU are performed by a first chip in the receiving apparatus, and the steps of receiving the second PPDU, reordering the MPDUs of the first traffic in the second PPDU, and updating the first last-arrived-SN are performed by a second chip in the receiving apparatus, wherein the first last-arrived-SN corresponding to the first traffic, the second last-arrived-SN corresponding to the second traffic and a bitmap are transferred from the first chip to the second chip after the reception of the first PPDU is completed by the first chip, wherein the bitmap indicates whether MPDUs belong to the BA window have been received successfully.

According to an embodiment of present disclosure, in the data reordering method, the receiving apparatus may update the first last-arrived-SN based on the SN of the at least one buffered MPDU belonging to the first traffic, and when receiving a MPDU belonging to the first traffic in the second PPDU whose SN is after the SN of the at least one buffered MPDU belonging to the first traffic, update the first last-arrived-SN based on the second last-arrived-SN and the SN of the MPDU belonging to the first traffic in the second PPDU whose SN is after the SN of the at least one buffered MPDU belonging to the first traffic.

According to an embodiment of present disclosure, in the data reordering method, the receiving apparatus may update the first last-arrived-SN based on a bitmap stored in the apparatus, wherein the bitmap indicates whether MPDUs belonging to the BA window have been received successfully.

In the data reordering method provided in the present disclosure, the MPDUs of different traffic in a PPDU may be reordered respectively. For the multi-layer transmission, the MPDUs of one traffic with no FCS error will not be queued in the reordering buffer when another traffic has FCS error. Therefore, the latency can be reduced.

Use of ordinal terms such as "first", "second", "third", etc., in the disclosure and claims is for description. It does not by itself connote any order or relationship.

The steps of the method described in connection with the aspects disclosed herein may be embodied directly in hardware, in a software module executed by a processor, or in a combination of the two. A software module (e.g., including executable instructions and related data) and other data may reside in a data memory such as RAM memory, flash memory, ROM memory, EPROM memory, EEPROM memory, registers, a hard disk, a removable disk, a CD-ROM, or any other form of computer-readable storage medium known in the art. A sample storage medium may be coupled to a machine such as, for example, a computer/processor (which may be referred to herein, for convenience, as a "processor") such that the processor can read information (e.g., code) from and write information to the storage medium. A sample storage medium may be integral to the processor. The processor and the storage medium may reside in an ASIC. The ASIC may reside in the UE. In the alternative, the processor and the storage medium may reside as discrete components in the UE. Moreover, in some aspects, any suitable computer-program product may comprise a computer-readable medium comprising codes relating to one or more of the aspects of the disclosure. In some aspects, a computer software product may comprise packaging materials.

It should be noted that although not explicitly specified, one or more steps of the methods described herein can include a step for storing, displaying and/or outputting as required for a particular application. In other words, any data, records, fields, and/or intermediate results discussed in the methods can be stored, displayed, and/or output to another device as required for a particular application. While the foregoing is directed to embodiments of the present disclosure, other and further embodiments of the present disclosure can be devised without departing from the basic scope thereof. Various embodiments presented herein, or portions thereof, can be combined to create further embodiments. The above description is of the best-contemplated mode of carrying out the present disclosure. This description is made for the purpose of illustrating the general principles of the present disclosure and should not be taken in a limiting sense. The scope of the present disclosure is best determined by reference to the appended claims.

The above paragraphs describe many aspects. Obviously, the teaching of the invention can be accomplished by many methods, and any specific configurations or functions in the disclosed embodiments only present a representative condition. Those who are skilled in this technology will understand that all of the disclosed aspects in the present disclosure can be applied independently or be incorporated.

While the present disclosure has been described by way of example and in terms of preferred embodiment, it should be understood that the present disclosure is not limited thereto. Those who are skilled in this technology can still make various alterations and modifications without departing from the scope and spirit of this present disclosure. Therefore, the scope of the present disclosure shall be defined and protected by the following claims and their equivalents.

What is claimed is:

1. A data reordering method performed by a receiving apparatus, comprising:
   receiving a first physical layer (PHY) protocol data unit (PPDU) from a transmitting apparatus, wherein the first PPDU comprises a plurality of medium access control (MAC) PDUs (MPDUs), and the MPDUs correspond to the same block acknowledgement (BA) window;
   determining a traffic that each of the MPDUs belongs to according to an MPDU identification, wherein traffics that the plurality of MPDUs belonging to comprise a first traffic and a second traffic which is different from the first traffic;
   performing a reordering operation for the MPDUs belonging to the first traffic, and a reordering operation for the MPDUs belonging to the second traffic, respectively; and
   transmitting a block acknowledgement (BA) frame in response to the first PPDU to the transmitting apparatus, wherein the BA frame comprises information for indicating whether the MPDUs in the first PPDU have been successfully received;

wherein there is at least one frame check sequence (FCS) error in the first traffic, the step of performing a reordering operation for the MPDUs belonging to the first traffic comprises:
maintaining a first last-arrived-SN corresponding to the first traffic as the last sequence number (SN) of the MPDUs of the first traffic that are prior to the MPDU with an FCS error of the first traffic if the MPDU with the FCS error of the first traffic is not received successfully; and
buffering at least one MPDU of the first traffic, wherein the SN of the at least one MPDU of the first traffic is later than the first last-arrived-SN corresponding to the first traffic.

2. The data reordering method of claim 1, wherein the MPDU identification comprises at least one of information carried in one field or a combination of multiple fields of an Internet Protocol (IP) header of each MPDU in the first PPDU, information carried in a type of service (TOS) and differentiated services code point (DSCP) field of the IP header of each MPDU in the first PPDU, information carried in a descriptor, information carried in a preamble of the first PPDU, and information carried in a MAC header of the first PPDU.

3. The data reordering method of claim 1, wherein the first traffic has a normal latency requirement or a high latency requirement and the second traffic has a low latency requirement.

4. The data reordering method of claim 1, wherein the MPDUs belonging to the first traffic are sent in a first modulation coding scheme (MCS) and the MPDUs belonging to the second traffic are sent in a second MCS.

5. The data reordering method of claim 1, wherein the step of performing a reordering operation for the MPDUs belonging to the second traffic further comprises:
reordering the MPDUs belonging to the second traffic without waiting for a retransmission of the MPDU with the FCS error of the first traffic when the MPDUs belonging to the second traffic are received after the MPDU with the FCS error of the first traffic.

6. The data reordering method of claim 5, wherein the step of reordering the MPDUs belonging to the second traffic comprises:
initializing or reinitializing a second last-arrived-SN corresponding to the second traffic to be a SN of an initial MPDU belonging to the second traffic in the first PPDU; and
updating the second last-arrived-SN synchronously along with the successful reception of consecutive MPDUs belonging to the second traffic.

7. The data reordering method of claim 6, the method further comprising:
receiving a second PPDU from the transmitting apparatus, wherein the second PPDU is the next PPDU of the first PPDU and only comprises the MPDUs belonging to the first traffic, and the MPDUs belonging to the first traffic in the second PPDU comprise a retransmitted MPDU;
reordering the MPDUs in the second PPDU; and
updating the first last-arrived-SN based on whether the MPDUs in the second PPDU have been received successfully.

8. The data reordering method of claim 7, wherein the first PPDU is received in a first band and the second PPDU is received in a second band, and the step of receiving the first PPDU and the step of performing a reorder operation for the MPDUs in the first PPDU are performed by a first chip, and the steps of receiving the second PPDU, reordering the MPDUs of the first traffic in the second PPDU, and updating the first last-arrived-SN are performed by a second chip, wherein the first last-arrived-SN corresponding to the first traffic, the second last-arrived-SN corresponding to the second traffic and a bitmap are transferred from the first chip to the second chip after the reception of the first PPDU is completed by the first chip, wherein the bitmap indicates whether MPDUs belong to the BA window have been received successfully.

9. The data reordering method of claim 7, wherein the step of updating the first last-arrived-SN based on whether the MPDUs of the first traffic have been received successfully comprising:
updating the first last-arrived-SN based on the SN of the at least one buffered MPDU belonging to the first traffic; and
when receiving a MPDU belonging to the first traffic in the second PPDU whose SN is after the SN of the at least one buffered MPDU belonging to the first traffic, updating the first last-arrived-SN based on the second last-arrived-SN and the SN of the MPDU belonging to the first traffic in the second PPDU whose SN is after the SN of the at least one buffered MPDU belonging to the first traffic.

10. The data reordering method of claim 7, wherein the step of updating the first last-arrived-SN based on whether the MPDUs belonging to the first traffic have been received successfully comprising:
updating the first last-arrived-SN based on a bitmap stored in the apparatus, wherein the bitmap indicates whether MPDUs belonging to the BA window have been received successfully.

11. An apparatus for data reordering, comprising:
a transceiver, configured to perform wireless transmission and reception to and from a transmitting apparatus; and
a processor, coupled to the transceiver, and configured to:
receive, via the transceiver, a first physical layer (PHY) protocol data unit (PPDU) from the transmitting apparatus, wherein the first PPDU comprises a plurality of medium access control (MAC) PDUs (MPDUs), wherein the MPDUs correspond to the same block acknowledgement (BA) window;
determine a traffic that each of the MPDUs belongs to according to an MPDU identification, wherein traffics that the plurality of MPDUs belonging to comprise a first traffic and a second traffic which is different from the first traffic;
perform a reordering operation for the MPDUs belonging to the first traffic, and a reordering operation for the MPDUs belonging to the second traffic, respectively, and
transmit, via the transceiver, a BA frame in response to the first PPDU to the transmitting apparatus, wherein the BA frame comprises information for indicating whether the MPDUs in the first PPDU have been successfully received;
wherein in response to there being at least one frame check sequence (FCS) error in the first traffic, when performing a reordering operation for the MPDUs belonging to the first traffic, the processor is further configured to:
maintain a first last-arrived-SN corresponding to the first traffic as the last sequence number (SN) of the MPDUs of the first traffic that are prior to the MPDU with an FCS error of the first traffic if the MPDU with the FCS error of the first traffic is not received successfully; and buffer at least one MPDU of the first traffic, wherein the SN of the at least one MPDU of the first traffic is later than the first last-arrived-SN corresponding to the first traffic.

12. The apparatus of claim 11, wherein the MPDU identification comprises at least one of information carried in one field or a combination of multiple fields of an Internet Protocol (IP) header of each MPDU in the first PPDU, information carried in a type of service (TOS) and differentiated services code point (DSCP) field of the IP header of each MPDU in the first PPDU, information carried in a descriptor, information carried in a preamble of the first PPDU, and information carried in a MAC header of the first PPDU.

13. The apparatus of claim 11, wherein the first traffic has a normal latency requirement or a high latency requirement and the second traffic has a low latency requirement.

14. The apparatus of claim 11, wherein the MPDUs belonging to the first traffic are sent in a first modulation coding scheme (MCS) and the MPDUs belonging to the second traffic are sent in a second MCS.

15. The apparatus of claim 11, when performing reordering operations for MPDUs of the second traffic in the first PPDU, respectively, the processor is further configured to:
   reorder the MPDUs belonging to the second traffic without waiting for a retransmission of the MPDU with the FCS error of the first traffic when the MPDUs belonging to the second traffic are received after the MPDU with the FCS error of the first traffic.

16. The apparatus of claim 15, wherein when performing reordering the MPDUs belonging to the second traffic, the processor is further configured to:
   initialize or reinitialize a second last-arrived-SN corresponding to the second traffic to be a SN of an initial MPDU belonging to the second traffic in the first PPDU; and
   update the second last-arrived-SN synchronously along with the successful reception of consecutive MPDUs belonging to the second traffic.

17. The apparatus of claim 16, wherein the processor is further configured to:
   receive a second PPDU from the transmitting apparatus, wherein the second PPDU is the next PPDU of the first PPDU and only comprises the MPDUs belonging to the first traffic, and the MPDUs belonging to the first traffic in the second PPDU comprise a retransmitted MPDU; and
   update the first last-arrived-SN based on whether the MPDUs in the second PPDU have been received successfully.

18. The apparatus of claim 16, further comprising:
   a second processor, coupled to the transceiver, and configured to:
   receive the first last-arrived-SN corresponding to the first traffic, the second last-arrived-SN corresponding to the second traffic and a bitmap from the first processor, wherein the bitmap indicates whether MPDUs belonging to the BA window have been received successfully;
   receive, via the transceiver, a second PPDU from the transmitting apparatus, wherein the second PPDU is the next PPDU of the first PPDU and only comprises the MPDUs belonging to the first traffic, and the MPDUs belonging to the first traffic in the second PPDU comprise a retransmitted MPDU; and
   updating the first last-arrived-SN based on the bitmap.

* * * * *